(12) United States Patent
Dezonmo

(10) Patent No.: US 6,233,333 B1
(45) Date of Patent: *May 15, 2001

(54) CTI INTEGRATION OF TELEPHONIC CALLS MOVED BETWEEN SWITCHES OF AN AUTOMATIC CALL DISTRIBUTOR

(75) Inventor: Anthony J. Dezonmo, Chicago, IL (US)

(73) Assignee: Rockwell Semiconductor Systems, Inc., Newport Beach, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/096,334

(22) Filed: Jun. 11, 1998

Related U.S. Application Data

(63) Continuation-in-part of application No. 08/859,534, filed on May 20, 1997.

(51) Int. Cl.[7] .................................................. H04M 50/00
(52) U.S. Cl. ........................... 379/266; 379/265; 379/309
(58) Field of Search ................... 379/111–115, 219–221, 379/265–266, 309, 242–243

(56) References Cited

U.S. PATENT DOCUMENTS

| | | | |
|---|---|---|---|
| 4,289,934 | 9/1981 | Pitroda et al. | 179/27 D |
| 4,979,171 | 12/1990 | Ashley | 370/110.2 |
| 5,008,930 * | 4/1991 | Gawrys et al. | 379/210 |
| 5,127,004 | 6/1992 | Lenihan et al. | 370/110.2 |
| 5,268,903 | 12/1993 | Jones et al. | 370/110.1 |
| 5,299,259 * | 3/1994 | Otto | 379/221 |
| 5,335,269 | 8/1994 | Steinlicht | 379/266 |
| 5,365,581 | 11/1994 | Baker et al. | 379/196 |
| 5,384,841 | 1/1995 | Adams et al. | 379/266 |
| 5,469,504 * | 11/1995 | Blaha | 379/265 |
| 5,500,891 | 3/1996 | Harrington et al. | 379/265 |
| 5,544,232 | 8/1996 | Baker et al. | 379/67 |
| 5,546,456 | 8/1996 | Vilsoet et al. | 379/265 |
| 5,724,419 * | 3/1998 | Harbuziuk | 379/265 |
| 5,740,240 * | 4/1998 | Jolissaint | 379/266 |
| 5,754,639 * | 5/1998 | Flockhart et al. | 379/266 |
| 5,901,215 * | 5/1999 | Dezonno | 379/266 |
| 5,987,117 * | 11/1999 | McNeil et al. | 379/265 |
| 6,038,308 * | 3/2000 | Anthos et al. | 379/219 |

* cited by examiner

*Primary Examiner*—Ahmad Matar
*Assistant Examiner*—Michael Cusick
(74) *Attorney, Agent, or Firm*—Welsh & Katz, Ltd.; James A. Scheer; Jon P. Christensen

(57) ABSTRACT

An apparatus and method are provided for identifying a call record of a telephone call to be moved from a source automatic call distributor to a destination automatic call distributor. The call record is of a type having been previously stored under a call identifier of the source automatic call distributor in a memory of the host computer serving both the source automatic call distributor and destination automatic call distributor in an area of the memory reserved for the source automatic call distributor. The method includes the step of storing a call action provided message in a call overflow table of the host computer including the call identifier of the telephone call and an identifier of the source automatic call distributor. The method further includes the step of transferring an overflow request to the destination automatic call distributor including the call identifier and searching the overflow table using the call identifier transferred to the destination automatic call distributor to locate the identifier of the source automatic call distributor. Finally, the method includes the step of locating the call record using the call identifier and located identifier of the source automatic call distributor.

23 Claims, 3 Drawing Sheets

CTI INTEGRATION OF TELEPHONIC CALLS MOVED BETWEEN SWITCHES OF AN AUTOMATIC CALL DISTRIBUTOR

This application is a continuation in part of U.S. Ser. No. 08/859,534, filed May 20, 1997.

FIELD OF THE INVENTION

The field of the invention relates to private branch exchange telephone systems and in particular to tracking of calls moved from one automatic call distributor to another automatic call distributor.

BACKGROUND OF THE INVENTION

Automatic call distribution systems are known. Such systems are typically used in an organizational context within private branch telephone exchanges (PBXs)as a means of distributing telephone calls among a group of agents of the organization. While the automatic call distributor (ACD) may be a separate part of the PBX, often the ACD is integrated into and is an indistinguishable part of the PBX.

Often the organization disseminates a single telephone number to its customers and to the public in general as a means of contacting the organization. As calls are directed to the organization from the public switch telephone network (PSTN), the automatic call distribution system directs the calls to its agents based upon some algorithm, typically based upon availability. For example, where all agents are consider equal, the ACD may distribute the calls based upon which agent position (telephone) has been idle the longest.

In order to distribute incoming calls from the PSTN to the available agents, the interaction of a controlling computer with a switching fabric of the PBX and ACD becomes essential. Often a connection to a local PSTN is in the form of a number of trunk connections. Each of the trunk connections is monitored by the controller for incoming calls. Where a call is detected, the controller searches for and selects an idle agent. Upon selecting an agent, the controller commands the switch to form a connection between the incoming trunk and selected agent.

In more complicated systems, the organization may use a number of telephone numbers to identify different individuals and functions within the organization. Each telephone number may be assigned to a particular incoming trunk or group of incoming trunk lines. As such, the controller may be required to recognize a call target based upon an identity of an incoming trunk line and route the call accordingly.

In other systems, the ACD of an organization may receive calls directed to different call targets over the same trunk lines. In such a case, the call target may be identified to the ACD by a pulse code modulated (PCM) signal transferred from the PSTN to the controller of the ACD by a dialed number identification service (DNIS) operating from within the PSTN.

In systems associated with service organizations, where many calls are received and handled by many agents, it may be important for an agent to have ready access to customer files. In such a situation, a database is maintained of existing customers. Customer records may be displayed on agent terminals as the agents converse with specific customers. In some cases, the customer may be identified to the database for display of records on the terminal by the agent entering a customer identifier into a keyboard associated with the terminal. Alternatively, the controller of the ACD may transfer an identifier of the customer to the database based upon an automatic number identification (ANI) facility, operating from within the PSTN.

Where ANI is used, the controller of the ACD receives the ANI digits (identifying the caller via the caller's telephone number) at the same time the call arrives from the PSTN. Upon selecting an agent, the controller may transfer a call to a queue for the selected agent or directly to the selected agent. At the same time that the call is delivered to the agent, the controller sends an identifier of the selected agent and ANI number of the customer to a controller of the database (the host). The host, in turn, displays the customer records via a computer monitor of the selected agent at the same time the call is delivered.

As a further feature, calls may be transferred among agents. Where a first agent finds that he or she cannot help a particular customer, the agent may activate a key on a keyboard of the agent and may enter an identity of another agent or agent group that may be better able to help the customer. The controller of the ACD may immediately connect the call to the newly identified agent, or may place the call in a queue until the identified agent becomes available.

In either case, the controller transfers a message to the host identifying the previous and newly identified agent. Since the host knows the identity of the customer displayed at the terminal of the previous agent, the host may now display those same customer records at the terminal of the newly selected agent.

Where a call is placed in a queue, the ACD controller may monitor a total time that the call has been in the queue. Where the time exceeds a threshold value, the controller may transfer (overflow) the call to a newly selected agent at another less heavily loaded ACD (overflow ACD) within the same organization. The controller of the transferring ACD transfers DNIS and ANI information as well as a call sequence number assigned by the transferring ACD to the overflow ACD. The overflow ACD, upon receiving the call, transfers the information to the host including an identifier that the call is an overflow call. The host in turn then polls each ACD to identify the transferring ACD and any newly created call records created by the transferring ACD.

While the existing method of ACD operation is relatively satisfactory, it is dependent upon a record of connection transactions as a method of identifying a call to the host. Where a connection to an agent is completed, a transaction identifier is sent to the host memorializing the transaction. The record of the connection is placed in a call record held in an area reserved for the transferring ACD. Where a call is received and placed in a queue for delivery to the next available agent, a call arrival message is sent to the host and saved in the transferring ACD's record area. Where the call is then transferred to another ACD, there is no means for directly identifying the transferring ACD and the host must poll each ACD to identify the call record of the call. Accordingly, a need exists for a better method of tracking overflow calls among ACDs.

SUMMARY

An apparatus and method are provided for identifying a call record of a telephone call to be moved from a source automatic call distributor to a destination automatic call distributor. The call record is of a type having been previously stored under a call identifier of the source automatic call distributor in a memory of the host computer serving both the source automatic call distributor and destination automatic call distributor in an area of the memory reserved for the source automatic call distributor. The method includes the step of storing a call action provided message in a call overflow table of the host computer including the call identifier of the telephone call and an identifier of the source automatic call distributor. The method further includes the step of transferring an overflow request to the destination automatic call distributor including the call identifier and searching the overflow table using the call identifier transferred to the destination automatic call distributor to locate the identifier of the source automatic call distributor. Finally, the method includes the step of locating the call record using the call identifier and located identifier of the source automatic call distributor.

DETAILED DESCRIPTION OF A PREFERRED EMBODIMENT

Figure 1:
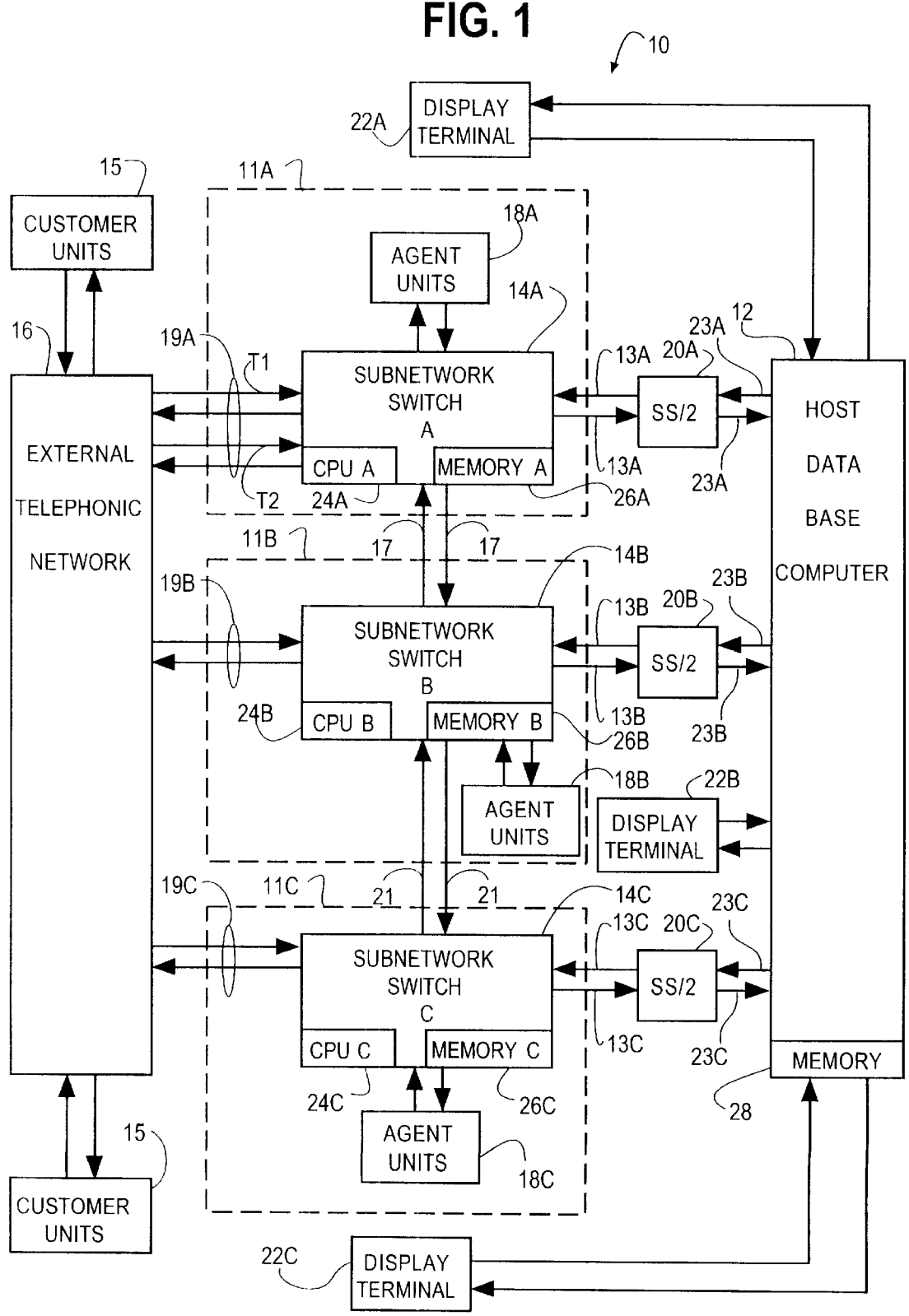
FIG. 1 depicts an automatic call distribution system in accordance with an embodiment of the invention.
Figure 2:
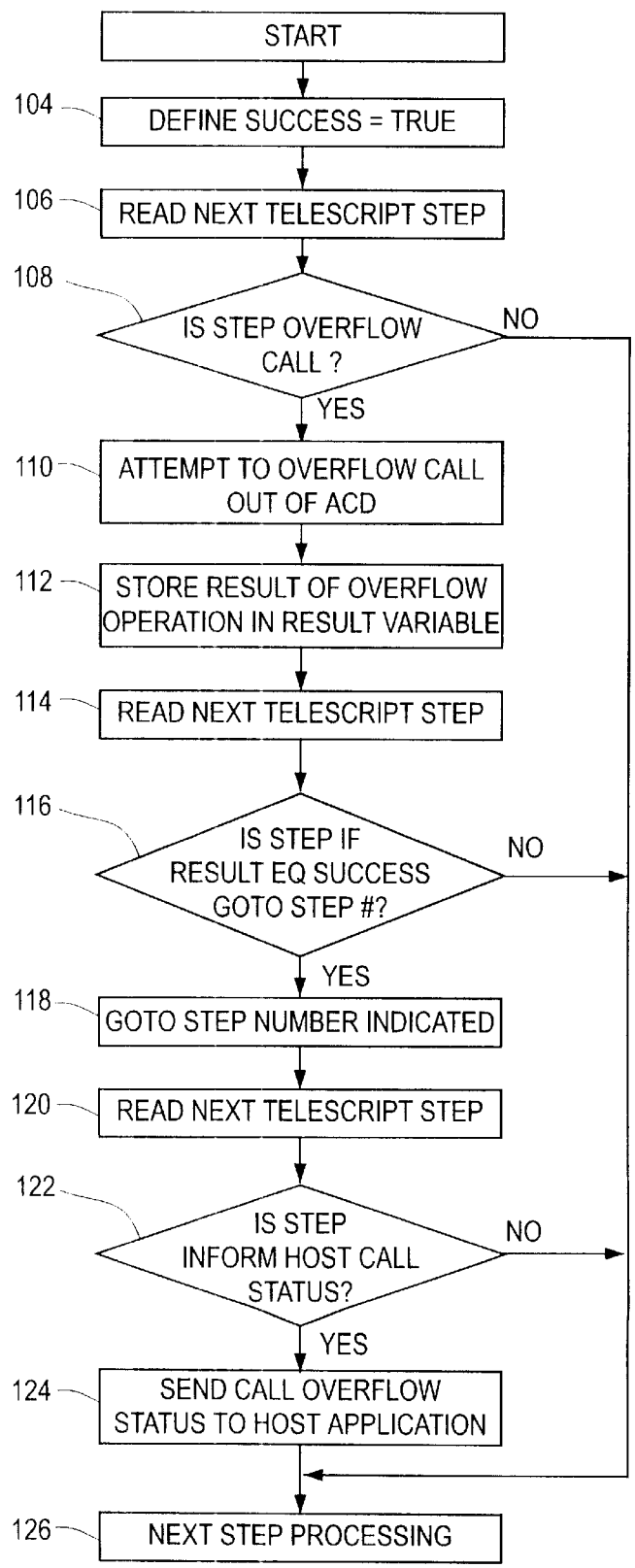
FIG. 2 is a flow chart depicting the process of the system of FIG. 1.

FIG. 1 is a block diagram of an automatic call distribution system 10 in accordance with an embodiment of the invention. FIG. 2 is a flow chart of activity of the system 10 under the embodiment. Reference shall be made to FIGS. 1 and 2 as appropriate to an understanding of the invention.

Under the embodiment, a first, second and third internal network 11A, 11B, 11C are connected to a host database computer 12 and the PSTN 16. Internal networks 11A, 11B, 11C may be located at geographically diverse locations and may be interconnected one-to-another by an appropriate interconnecting group of private lines 17, 21 (e.g., leased lines, virtual private lines, microwave links, dedicated T1 lines, etc.). Similarly, the internal networks 11A, 11B, 11C may be interconnected with the host 12 through an appropriate data link (e.g., leased lines, virtual private lines, microwave link, the Internet, digital packet switching, etc.).

The internal networks 11A, 11B, 11C may be connected to the PSTN 16 through a number of trunk lines 19A, 19B, 19C. The PSTN 16 may offer service on the trunk lines 19A, 19B 19C in association with services such as ANI and DNIS. Call control, call maintenance, and call set-up may be accomplished over the trunk line itself or over an associated control channel.

DNIS information supplied by the PSTN 16 is useful for the internal networks 11A, 11B, 11C where inbound calls to the internal networks 11A, 11B, 11C may be directed to any of a large block of telephone numbers assigned to each of the internal networks 11A, 11B, 11C. This may be useful where the block of numbers to the internal network (e.g., 11A) is connected through the trunk lines 19A in rotary fashion, so that when the calling party from the PSTN appears, for example, on trunk T1, it can be determined whether the calling party was, in fact, calling the telephone number corresponding to trunk T1 or was, in fact, calling the telephone number corresponding to trunk T2 and was rotated down to the next available trunk, T1.

With regard to inbound calls, the switches 14A, 14B, 14C function to selectively interconnect calls from external customer units 15 of the external PSTN 16 to agents 18A, 18B, 18C of the internal networks 11A, 11B, 11C. As such, each switch 14A, 14B, 14C functions as an automatic call distributor within its own internal ACD network 11A, 11B, 11C.

The switches 14A, 14B, 14C are controlled by central processing units, or CPUs, 24A, 24B, 24C, in conjunction with peripheral memory devices 26A, 26B, 26C. Control of the switches 11A, 11B, 11C and communications with the host 12 and PSTN 16 may be accomplished generally as described in U.S. Pat. No. 5,268,903, and U.S. Pat. No. 5,140,611, both to Jones, and both incorporated herein by reference. Routing of calls to agents 18A, 18B, 18C and overflow of calls may be accomplished generally as described in: U.S. Pat. No. 5,335,269 to Steinlicht et al.; U.S. Pat. No. 5,365,581 to Baker et al.; and U.S. Pat. No. 5,384,841 to Adams et al., all incorporated herein by reference.

During operation, the CPUs 24A, 24B, 24C monitor 108 each port of the switch 14A, 14B, 14C for changes in status. A change in status may be an agent unit 18A, 18B, 18C going off-hook to make a call 110, an agent unit 18A, 18B, 18C hanging up after a call 118, or it may be a call alerting tone detected on a trunk 19A, 19B, 19C alerting the CPU 24A, 24B, 24C to the presence of an incoming call 110.

Where the status change is an agent 18A, 18B, 18C hanging up 118, the CPU 24A, 24B, 24C acts to tear-down the call connection within the switch 14A, 14B, 14C between the agent at a first port of the switch and a second party to the conversation communicating through a second port of the switch 14A, 14B, 14C. Upon tear down of the connection, the CPU 24A, 24B, 24C also sends a message to the host 120, notifying the host of termination of the call connection. The message to the host 12 would include at least the identity of the agent 18A, 18B, 18C.

Where the status change is an agent 18A, 18B, 18C going offhook, the CPU 24A, 24B, 24C interprets such change as preparation for the placement of a telephone call. As such, the CPU 24A. 24B, 24C prepares to receive a set of dialed digits. Upon receiving the digits and if the digits are determined as being a call directed to an outside party, then the CPU 24A, 24B, 24C may seize an outgoing trunk line 19A, 19B, 19C and send a call alert followed by the dialed digits. Where the alert is answered by a call connection acknowledgment, the CPU 24A, 24B, 24C completes the connection between the port of the agent (e.g., 18A, 18B, 18C) and the port of the seized trunk line.

If the call is directed to another agent 18A, 18B, 18C or some other party within the organization, then the CPU 24A, 24B, 24C may identify the port to which the calling party is to be connected by reference to a look-up table within memory 26A, 26B, 26C. Upon locating the party, the CPU 24A, 24B, 24C may then cause a connection to be set-up between appropriate ports within the switch 14A, 14B, 14C between the calling and called party.

Where the status change is a call alert signal on an incoming trunk line (or control channel associated with the incoming trunk line), then the CPU 24A, 24B, 24C may send an acknowledge message to the PSTN 16 accepting the call. The PSTN 16 may respond with the forwarding of DNIS and ANI messages, identifying the called and calling party.

Upon accepting the call, the CPU 24A, 24B, 24C first stores the DNIS and ANI numbers in a termination table of the memory 26A, 26B, 26C. More specifically, the CPU 24A, 24B, 24C maintains a table of call information for each port of the switch 14A, 14B, 14C. Where a call is accepted on an incoming trunk line, the CPU 24A, 24B, 24C enters the DNIS and ANI number into the table for the incoming trunk line upon which the call is received.

In addition to updating the termination table within memory 26A, 26B, 26C, the CPU 24A, 24B, 24C also generates a call identifier (also sometimes referred to as a call ID or sequence number) for the call, unique to the switch 14A, 14B, 14C. The call identifier along with the ANI and DNIS numbers may then be sent 112 to the host 12 as part of a call arrival message. Delivery of the ANI and DNIS numbers and call identifier allows the host 12 to create a unique call record for the call in memory 28, in a call record area of memory 28 reserved for the switch 14A. The call record may be used to retrieve customer records for delivery to an appropriate display terminal 22A, 22B, 22C once the call has been assigned to an agent 18A, 18B, 18C.

The CPU 24A, 24B, 24C then, by reference to the DNIS number, determines the identity of agent 18A, 18B, 18C to which the call is to be directed. For example, the DNIS number may be used to differentiate between calls directed to a first telephone number arriving on a first incoming trunk group directed to a sales group of the organization from calls directed to a service group of the organization. Since agents servicing sales calls would, in most cases, not handle calls directed to service, the DNIS number provides a convenient means of differentiating between two or more types of calls.

Upon determining the identity of the agent 18A, 18B, 18C (or group of agents) the CPU 24A, 24B, 24C instructs the switch 14A, 14B, 14C to internally connect the port of the incoming trunk to a port of one of the identified agents.

Where the call has been connected to an agent, the CPU 24A, 24B, 24C stores the port number of the identified agent in the termination table for the port of the incoming trunk. Likewise, the CPU 24A, 24B, 24C stores the port identifier of the incoming trunk in the termination table of the identified agent.

To complete set-up of the call to the identified agent, the CPU 24A, 24B, 24C sends 116 a call completion message to the host 12. The call completion message includes at least a port identifier of the identified agent and the call identifier. The information of the call completion message is stored in the call record previously created in conjunction with arrival of the call arrival message. The port identifier and call identifier allows the host 12 to deliver customer data to the specific display terminal 22A, 22B, 22C of the agent to which the call was delivered.

In the alternative, if all of the agents (e.g., 18A) were busy, then an incoming call (e.g., received on incoming trunk T1 of the first switch 14A) would be placed in a queue. While in the queue, the CPU 24A would compare certain parameters of each call in the queue (e.g., time in the queue) with a set of overflow threshold values. Where the parameters of the queued call exceed one or more of the overflow threshold values, the call may be considered a candidate for overflow 122 to another switch.

Figure 4:
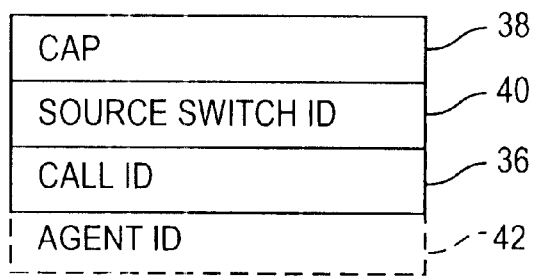
FIG. 4 depicts a call action provided message of the system of FIG. 1.

In preparation for overflowing the call, the CPU 24A sends 128 a call action provided (CAP) message (FIG. 4) to the host 12. The CAP message is stored in a call overflow table in memory 28 for later reference in identifying the original call record created by the first switch 14A.

In further preparation for overflow, the CPU 24A retrieves an identity of the next overflow destination (e.g., switch 14B) from a stack within the CPU 24A. Upon identifying the overflow destination, the CPU 24A seizes an interconnect channel 17 through an interconnect port of the switch 14A and forwards a transfer request over the interconnect 17 between the source switch 14A and the destination switch 14B. While in some cases the CPU 24A may actually seize the interconnect channel 17, in other cases the CPU 24A may seize a control channel of the interconnect 17A for transfer of the transfer request, followed by a seizing of the actual interconnect channel 17 the call is accepted. The transfer request may be under a pulse coded modulation (PCM) or any other appropriate format. The transfer request may include at least five data fields. The first data field may identify the transmission as being a transfer request. The second data field may identify the overflow destination and the third field may be an identifier of the called party (e.g., DNIS digits) and of the calling party (e.g., ANI digits). The last field would include the call identifier assigned by the original switch 14A. The fifth field may include an identifier of the transferring ACD 14A.

If the destination switch 14B accepts the call, a call accepted message is returned over the interconnect 17. Upon receiving the call accept message, the CPU 24A of the switch 14A instructs the switch 14A to form a connection between the incoming trunk port T1 and the interconnect port 17 for purposes of transferring the call.

If the destination switch 14B did not accept the call, then the CPU 24A may retrieve the next potential overflow destination from the internal stack of the CPU 24A. The next overflow destination may be switch 14C. To execute the overflow, the CPU 24A may again seize an interconnect 17 and transfer an overflow request.

Since the overflow request is not directed to the second switch 14B, the CPU 24B of the second switch 14B interprets the transmission as a request for a connection between the first interconnect 17 an a second interconnect 21. The CPU 24B, in turn, instructs the switch 14B to form an internal connection between the first interconnect 17 and second interconnect 21.

Upon receipt of the request by the third switch 14C, the CPU 24C may determine that it can accept the transfer and returns a transfer accepted message through the connection within the second switch 14B to the first switch 14A. Upon receiving the transfer accepted, the CPU 24A of the first switch 14A instructs the switch 14A to form an internal connection between the port of the incoming trunk T1 and the outgoing interconnect 17. Since the connection through the second switch 14B is still intact, the call received on the incoming trunk T1 at the first switch 14A has effectively been transferred to the third switch 14C.

The CPU 24C of the third switch 14C, at this point, knows the agent group requested by the call based upon the DNIS number within the call request. As a consequence, the third CPU 24C may place the call in a queue and, at an appropriate instant, connect the call to a selected agent 18C.

The CPU 24C, may also transfer the ANI digits of the caller to the host 12 for purposes of identifying customer records. The host 12, however, does not know if it was the second switch 14B that originated the transfer, or the first switch 14A. Further, since an identifier of the source ACD 11A is not available to the host 12, the host cannot yet identify the call record created by the first switch 14A.

The prior art has taught that for a switch to identify the source of the call transfer, a polling operation must be performed on the other switches. The polling may be performed by transferring a request to the host 12 requesting that each switch of the system 10 be polled to find out the identity of the switch 14A which directed a call transfer to the destination switch 14C at that instant the destination switch 14C received the transfer request. The polling operation may be carried out by the host 12 sequentially searching the call records of each ACD 11A, 11B, 11C.

Under the embodiment, the polling of switches 14A, 14B, 14C is avoided through the transfer of a call action provided (CAP) message (FIG. 4), reserved for use in identifying calls arriving at an overflow destination. The CAP message may be transferred to the host 12 before the transfer of a call. The CAP message is stored in an overflow table within a memory 28 of the host 12, in an area not associated with any particular switch 14A, 14B, 14C.

In the example given above of a call transferred from an incoming trunk T1, the CAP message to the host 12 includes at least two fields. The first field is an identifier 40 of the sending switch 14A. The second field is the call identifier 36 assigned by the source switch 14A. A third optional field 42 is provided for identification of an agent 18A, in the case where the call has been answered by an agent 18A and subsequently transferred.

Figure 5:
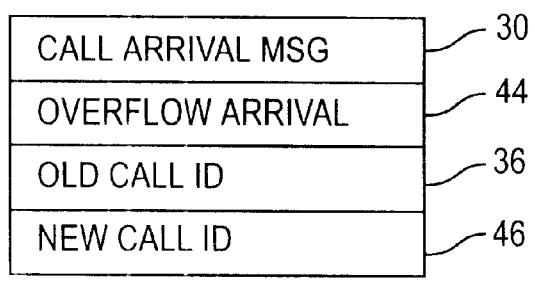
FIG. 5 depicts an overflow arrival message of the system of FIG. 1.

When the destination switch 14C receives the call, the destination switch 14C assigns a new call identifier (new call ID) to the call. The destination switch 14C also sends a call arrival message (FIG. 5) to the host 12. In this case, however, the destination switch does not have a sufficient number of data fields in the call arrival message to send both the source switch ID and call identifier of the source ACD 11A. Instead, the destination switch 14C sends an indication 44 that the call is an overflow call, the call identifier 36 of the source switch 14A and the new call ID 46 of the overflow call.

Figure 3:
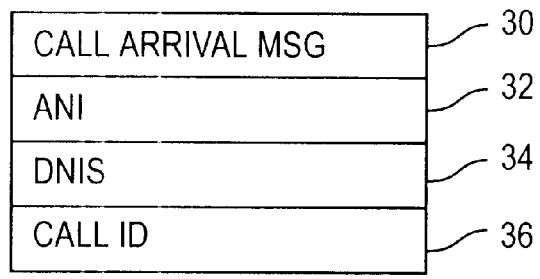
FIG. 3 depicts a call arrival message used by the system of FIG. 1.

Upon receiving the call arrival message from the destination switch 14C, the host 12 searches an overflow table in memory 28 of the host 12 using the call identifier 36 assigned by the source switch 14A. Upon matching the call identifier 36 in the call overflow table, the host 12 is able to find an identifier of the source switch 14A. Upon identifying the source switch 14A, the host 12 in turn is able to search the call records of the source ACD 11A, identify and retrieve the call record (FIG. 3) and the ANI 32 of the customer. Upon identifying the proper file, the host 12 transfers the call record to the memory area of the destination switch 14C. When the call is subsequently delivered to a selected agent 18C, the call record may now be used to simultaneously deliver customer records to the terminal display 22C of the selected agent 18C.

Under another embodiment of the invention, calls may be moved from one ACD to another using the above-described call action provided message through the PSTN 16. Under the embodiment, calls may be more properly referred to as having been moved because the call route to the ACD system 10 may be changed within the PSTN 16 as the call is moved from a first ACD 11A to a second ACD 11B and also because the basis of the move may be different from that used to characterize overflow.

Call moves may be desireable for any of a number of reasons. Call overflow (due to capacity limitations) may be one reason, but is certainly not the only reason. For instance, a call may be moved where it is determined by a first ACD 11A that the first ACD 11A does not have the appropriate (as opposed to sufficient) resources to handle the call. Such a case may arise where different ACDs of an ACD system 10 are geared to handle different types of products.

Further, an agent at the first ACD 11A may already have discussed the caller's problem with the caller and may have collected customer information from the caller in addition to the ANI and DNIS information collected by the ACD 10 from the PSTN 16 during call delivery. The ability to pass on any collected information with the call is beneficial because the information may be used to expedite call handling through another ACD.

Call movement within the PSTN 16 may be accomplished using any of a number of processes. For example, call transfer may be used along with other features of the system 10 to accomplish a call move. Where the interconnect 19A, 19B, 19C with the PSTN 16 is an ISDN connection, call movement may be accomplished via instructions forwarded to the PSTN 16 over the "D" channel associated with the incoming telephone call to be moved.

To accomplish call movement from a first ACD 11A (i.e., the moving ACD) to a second ACD 11B (i.e., the destination ACD), the first ACD 11A transmits a call forwarding instruction (message) to an ISDN controller (not shown) within the PSTN 16. Within the call forwarding message, a field is provided for a destination telephone number (e.g., the second ACD 11B).

Also included within the call forwarding message is a user-to-user data element (user field) that may be delivered along with the moved call. Within the user field, the moving ACD 11A may insert (among other things) an ACD identifier, identifying itself as the source ACD 11A and an indication to the destination ACD 11B that the associated call is being moved from the source ACD 11A to the destination ACD 11B. Also included in the user field may be other information such as the call identifier assigned by the originating ACD 11A when it was received at the originating ACD 11A.

Call moves may also be accomplished using non-ISDN lines. For example, a first ACD 11A may request permission and may transfer identifying information about the call over interconnect lines 17. Upon receiving permission, the originating ACD 11A may transfer the call to the destination ACD 11B through the PSTN 16.

For example, a flash-hook on the incoming connection may be used to place the call on hold. A transfer number may be outpulsed to the PSTN 16 over the line using pulse coded modulation (PCM). The PSTN 16 may then transfer the call to the destination ACD 11B.

In general, call moves may be initiated for any of a number of reasons. The source ACD (e.g., 11A) may determine that the call is an overflow candidate based upon any of a number of queuing parameters (e.g., time in queue). Alternatively, an agent receiving the call at a first ACD 11A may determine (from the subject matter of the discussion with the caller) that the call could be better handled through another ACD.

Where it is the agent who determines that the call should be moved, the agent may simply activate a TRANSFER button on the agent unit 18A. Following activation of the TRANSFER button, the agent may enter a specific agent code, the code of another ACD (e.g., 11B) or a subject matter code.

In any case, the CPU 24A may (by reference to a look-up table) proceed to determine a route through which to move the call. Once a route has been determined (or in some cases before), the CPU 24A transfers a CAP message (FIG. 4) to the host 12. The host 12 may store the CAP message in an overflow table (or in the case of call moves), or in a (more general) call move table (that may also be labeled a call action provided table).

Where the call is to be moved to another ACD (11B) through the PSTN 16, the CPU 24A also composes and forwards a call transfer request to the PSTN 16. Included as part of the call transfer request (transferred over the "D"

channel associated with the call to be moved) is a call destination and the packet of user to user information. Within the user packet may be five elements. The first element may identify the packet as a user-to-user transmission. The second element may be an indication that the transfer is a call move. The third element may be an identifier of the originally called party 11A (e.g., DNIS digits). The fourth element may be the call identifier assigned by the originating ACD 11A. The last field may the ACD identifier of the transferring ACD 11A.

Once the PSTN 16 receives the call transfer request, the call is moved to the requested destination ACD 11B along with the user packet, included with the call transfer request. Once the call is received, the destination ACD 11B composes a call arrival message (either the same or similar to that of FIG. 5) and transfers the message to the host 12.

Once received by the host 12, the host 12 searches the overflow table (or call action provided table, or call move table) for a message indicating a call move. As above, the host 12 may identify the proper call action provided message by matching the call identifier received in the user packet from the PSTN 16 with the call identifier assigned by the originating ACD. Upon matching the call identifier of the originating ACD, the host 12 is able to identify the originating ACD. With a knowledge of the originating ACD and of the call identifier assigned by the originating ACD, the host 12 is now able to identify and retrieve the call record created by the originating ACD. Once identified, the call record may then be presented to an assigned agent at the destination ACD 11B through a terminal 22B of the assigned agent.

The use of the CAP message improves the speed and efficiency of the call overflow and move operations by allowing the host 12 to quickly and easily identify call records without the time consuming step of searching the call records of each ACD 11A, 11B, 11C. The use of the CAP message from the transferring ACD also provides the host 12 with a means for identifying overflow and moved calls on an exception basis rather than requiring a modification of the structure of the call arrival message, which must be executed for each call.

A specific embodiment of a method and apparatus of overflowing and moving calls according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention any and all modifications, variations, or equivalents that fall within the true spirit and scope of the basic underlying principles disclosed and claimed herein.

What is claimed is:

1. A method of identifying a call record of a telephone call to be moved from a source automatic call distributor to a destination automatic call distributor, the call record having been previously stored under a call identifier of the source automatic call distributor in a memory of a host computer serving both the source automatic call distributor and destination automatic call distributor in an area of the memory reserved for the source automatic call distributor, such method comprising the steps of:

storing a call action provided message in a call table of the host computer including the call identifier of the telephone call and an identifier of the source automatic call distributor;

transferring a move request from the source automatic call distributor to the destination automatic call distributor including the call identifier;

searching the call table using the call identifier transferred to the destination automatic call distributor to locate the identifier of the source automatic call distributor; and locating the call record using the call identifier and located identifier of the source automatic call distributor.

2. The method of identifying a call record of a telephone call to be moved from a source automatic call distributor to a destination automatic call distributor as in claim 1 wherein the step of transferring the move request further comprises moving the call from the source automatic call distributor to the destination call distributor through a public switched telephone network.

3. The method of identifying a call record of a telephone call to be moved as in claim 2 wherein the step of moving the call through the public switched telephone network further comprises transferring a call transfer request from the source automatic call distributor to the public switched telephone network.

4. The method of identifying a call record of a telephone call to be moved as in claim 3 wherein the step of moving the call through the public switched telephone network further comprises transferring a user to user message to the destination automatic call distributor through the public switched telephone network.

5. The method of identifying a call record of a telephone call to be moved as in claim 4 wherein the step of transferring the user to user message to the destination automatic call distributor through the public switched telephone network further comprises including a call identifier assigned by the source automatic call distributor in the user to user message.

6. The method of identifying a call record of a telephone call to be moved as in claim 5 wherein the step of transferring the user to user message to the destination automatic call distributor through the public switched telephone network further comprises including an identifier of the source automatic call distributor in the user to user message.

7. The method of identifying a call record of a telephone call to be moved as in claim 3 wherein the step of moving the call through the public switched telephone network further comprises transferring a call move message to the destination automatic call distributor through an interconnect between the source and destination automatic call distributor.

8. The method of identifying a call record of a telephone call to be moved as in claim 7 wherein the step of transferring the call move message to the destination automatic call distributor through the interconnect further comprises including a call identifier assigned by the source automatic call distributor in the user to user message.

9. The method of identifying a call record of a telephone call to be moved as in claim 8 wherein the step of transferring the call move message to the destination automatic call distributor through the interconnect further comprises including an identifier of the source automatic call distributor in the user to user message.

10. The method of identifying a call record of a telephone call to be moved as in claim 1 wherein the step of locating the call record using the call identifier and located identifier of the source automatic call distributor further comprises searching the area of the memory reserved for the source automatic call distributor for the call record stored under the call identifier.

11. Apparatus for identifying a call record of a telephone call to be moved from a source automatic call distributor to a destination automatic call distributor, the call record having been previously stored under a call identifier of the source automatic call distributor in a memory of a host computer serving both the source automatic call distributor and destination automatic call distributor in an area of the memory reserved for the source automatic call distributor, such apparatus comprising:

means for storing a call action provided message in a call table of the host computer including the call identifier of the telephone call and an identifier of the source automatic call distributor;

means for transferring a move request from the source automatic call distributor to the destination automatic call distributor including the call identifier;

means for searching the call table using the call identifier transferred to the destination automatic call distributor to locate the identifier of the source automatic call distributor; and means for locating the call record using the call identifier and located identifier of the source automatic call distributor.

12. The apparatus for identifying a call record of a telephone call to be moved from a source automatic call distributor to a destination automatic call distributor as in claim 11 wherein the means for transferring the move request further comprises means for moving the call from the source automatic call distributor to the destination call distributor through a public switched telephone network.

13. The apparatus for identifying a call record of a telephone call to be moved as in claim 12 wherein the means for moving the call through the public switched telephone network further comprises means for transferring a call transfer request from the source automatic call distributor to the public switched telephone network.

14. The apparatus for identifying a call record of a telephone call to be moved as in claim 13 wherein the means for moving the call through the public switched telephone network further comprises means for transferring a user to user message to the destination automatic call distributor through the public switched telephone network.

15. The apparatus for identifying a call record of a telephone call to be moved as in claim 14 wherein the means for transferring the user to user message to the destination automatic call distributor through the public switched telephone network further comprises means for including a call identifier assigned by the source automatic call distributor in the user to user message.

16. The apparatus for identifying a call record of a telephone call to be moved as in claim 15 wherein the means for transferring the user to user message to the destination automatic call distributor through the public switched telephone network further comprises means for including an identifier of the source automatic call distributor in the user to user message.

17. The apparatus for identifying a call record of a telephone call to be moved as in claim 13 wherein the means for moving the call through the public switched telephone network further comprises means for transferring a call move message to the destination automatic call distributor through an interconnect between the source and destination automatic call distributor.

18. The apparatus for identifying a call record of a telephone call to be moved as in claim 17 wherein the means for transferring the call move message to the destination automatic call distributor through the interconnect further comprises means for including a call identifier assigned by the source automatic call distributor in the user to user message.

19. The apparatus for identifying a call record of a telephone call to be moved as in claim 18 wherein the means for transferring the call move message to the destination automatic call distributor through the interconnect further comprises means for including an identifier of the source automatic call distributor in the user to user message.

20. The apparatus for identifying a call record of a telephone call to be moved as in claim 11 wherein the means for locating the call record using the call identifier and located identifier of the source automatic call distributor further comprises means for searching the area of the memory reserved for the source automatic call distributor for the call record stored under the call identifier.

21. Apparatus for identifying a call record of a telephone call to be moved from a source automatic call distributor to a destination automatic call distributor, the call record having been previously stored under a call identifier of the source automatic call distributor in a memory of a host computer serving both the source automatic call distributor and destination automatic call distributor in an area of the memory reserved for the source automatic call distributor, such apparatus comprising:

a call action processor which stores a call action provided message in a call table of the host computer including the call identifier of the telephone call and an identifier of the source automatic call distributor;

a communication processor which transfers a move request from the source automatic call distributor to the destination automatic call distributor including the call identifier;

a search processor which searchs the call table using the call identifier transferred to the destination automatic call distributor to locate the identifier of the source automatic call distributor; and call record processor which locates the call record using the call identifier and located identifier of the source automatic call distributor.

22. The apparatus for identifying a call record of a telephone call to be moved from a source automatic call distributor to a destination automatic call distributor as in claim 21 wherein the communication processor which transfers the move request further comprises a control interface with a public switched telephone network which moves the call from the source automatic call distributor to the destination call distributor through the public switched telephone network.

23. The apparatus for identifying a call record of a telephone call to be moved as in claim 22 wherein the control interface further comprises an ISDN interface.

* * * * *